(No Model.)
D. W. RAIDT.
VEHICLE TONGUE.
No. 439,557. Patented Oct. 28, 1890.
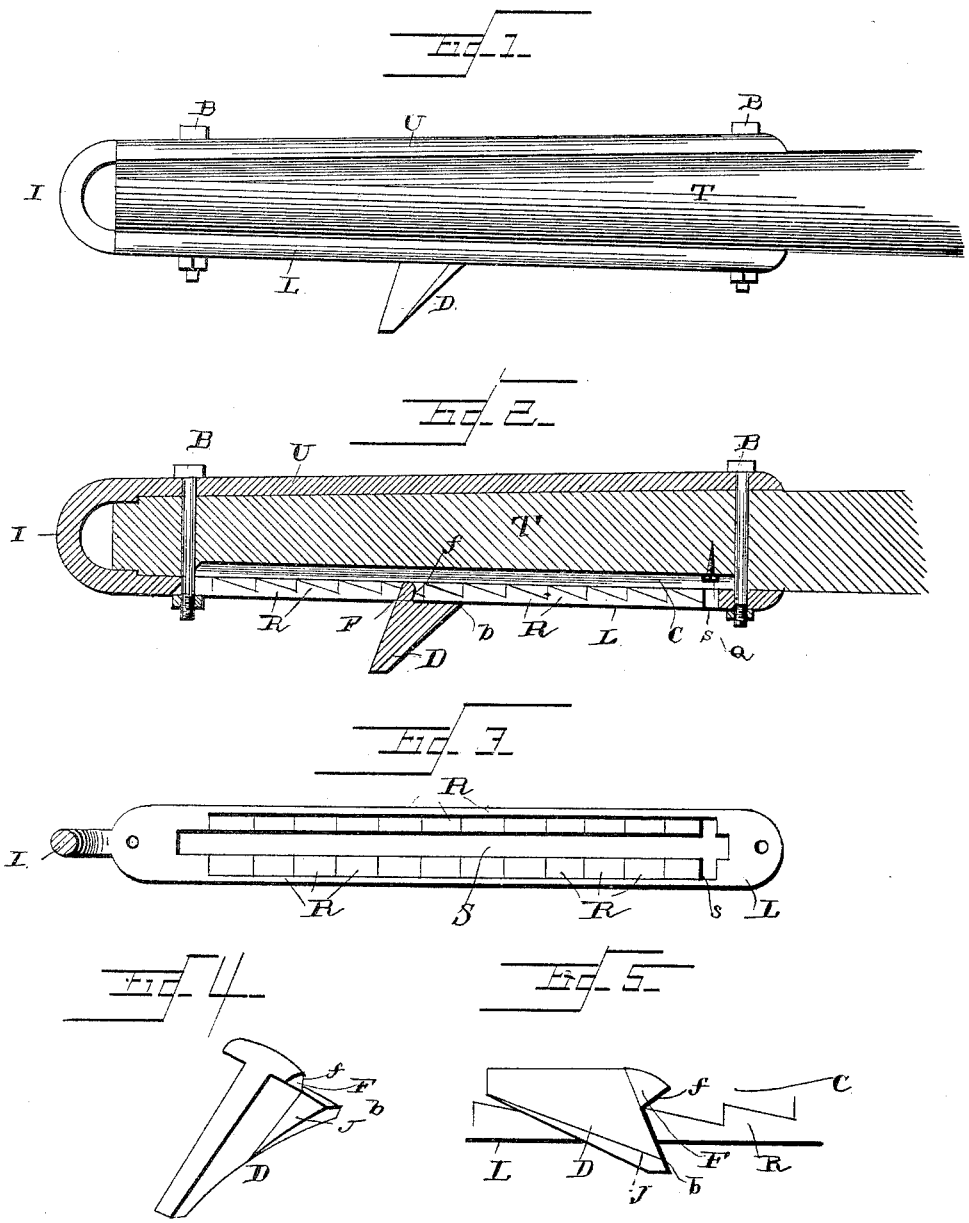
Witnesses:
Inventor
Daniel W. Raidt.
By his Attorneys

United States Patent Office.

DANIEL W. RAIDT, OF NEW MADRID, MISSOURI.

VEHICLE-TONGUE.

SPECIFICATION forming part of Letters Patent No. 439,557, dated October 28, 1890.

Application filed December 31, 1889. Serial No. 335,500. (No model.)

*To all whom it may concern:*

Be it known that I, DANIEL W. RAIDT, a citizen of the United States, residing at New Madrid, in the county of New Madrid and State of Missouri, have invented a new and useful Vehicle-Tongue, of which the following is a specification.

This invention relates to vehicle-tongues of that class which are adjustable at their forward ends; and it consists of a toothed rack secured to the under side of the tongue and a dog adapted to engage said rack at different points to adjust the tongue in length, all as will hereinafter more fully appear.

It is well known that the nearer the horse is to the load upon a vehicle which it is intended he shall draw the easier the draft, and heretofore when a small horse or a mule was to be attached to a vehicle having a pole of ordinary length it was found necessary to shorten the traces and to lengthen the neck-yoke strap in order that the animal might be attached by the harness in the proper relative position to the vehicle. It has been suggested, however, that instead of lengthening and shortening the neck-yoke straps their point of connection with the tongue near its forward end might be adjusted, and to this end I have constructed the hereinafter-described device, whereby this adjustment can be readily accomplished in a simple and effective manner and without any material loss of time.

The following specification describes and the accompanying drawings illustrate what I consider the best manner of carrying out my invention.

In the said drawings, Figure 1 is a side elevation of the forward end of a vehicle-tongue provided with my improved attachment. Fig. 2 is a central vertical longitudinal section of the same. Fig. 3 is a plan view of the lower strap removed. Fig. 4 is a detail view of the dog removed. Fig. 5 is a side view of the dog, showing it in the toothed bar.

The letter T represents a tongue or pole of a vehicle. U is a metallic strap passing along the upper side of this tongue from its forward end to a point about sixteen inches rearwardly of said end, and L is another metallic strap occupying a corresponding position on the lower side of the tongue. These two straps are preferably of malleable iron and in a single piece, and at their forward extremities they are reduced in size and bowed outwardly slightly beyond the end of the tongue to form the eye I. The under face of the tongue is cut away, as shown at C in Fig. 2, and this cut-away portion stands directly opposite the lower strap L, by which it is covered. The rear and forward ends of this strap extend slightly beyond the cut-away portion, and bolts B may be passed through the tongue and both straps, as shown in the drawings, whereby the parts are firmly secured in relative position.

The lower strap L is provided with a longitudinal slot S, having a short transverse enlargement $s$ at its rear end, as seen in Fig. 3. This slot is not as great in width as the width of the cut-away portion C, and this difference in their widths leaves portions of the strap on either side of the slot S, which cover the cut-away portion in the tongue. The upper or inner faces of these projecting portions have ratchet-teeth R formed upon them, the faces of which ratchets are forward.

In Figs. 4 and 5 I have shown the construction of the dog or pawl D, comprising a body of triangular shape, laterally-extending feet F at its inner upper corner, and a flange J along its lower edge. The feet F of this dog are inserted in the enlargement $s$ of the slot S, and the dog is then carried bodily forward, said feet slipping over the beveled faces of the ratchet-teeth R, and when the desired point has been reached the dog is allowed to drop, so that the shoulders $b$ of its flange J will abut upwardly against the outer face of the lower strap on either side of the slot, in which position the flat rear face $f$ of the feet will abut squarely against the flat faces of any of the ratchet-teeth with which the dog may be in engagement. If, now, it is desired to adjust the dog rearwardly in the slot, its point is raised and pressed into the slot, when the dog will be in the position shown in Fig. 5. In this position it will be seen that the flat faces $f$ of the feet F are presented in an inclined position to the flat front faces of the ratchet-teeth R, whereby when the dog is moved rearwardly said feet F will ride up and over said ratchet-teeth without engaging therewith.

The several parts of my device having been assembled in position on the tongue, its operation is as follows: The animal to be hitched to the vehicle is connected by the traces and other members of the harness in the ordinary manner, and the eye or ring, depending from the center of the neck-yoke bar, (for it will be understood that this invention is applicable only to vehicles drawn by two animals, otherwise there would be no central pole or tongue,) is passed over the end of the tongue, which it surrounds, and slipped back against the dog D. The latter is then adjusted forward and back to any desired degree, thereby lengthening or shortening the harness at this point, as may be desirable or necessary from the length of the different animals to be hitched up, the distance it is desired to have them from the load, or any other reason.

It will be understood, of course, that a third horse can be hitched to the tongue or a doubletree, and a pair of horses by a hook connecting with the eye I at the front end of the pole. It will also be understood that when it is desired to remove the dog from the slot S in the lower strap L it can be passed back until its feet register with the enlargement s at the rear end of said slot, when it can be withdrawn with ease. In some cases, however, I find it desirable to prevent all possibility of the dog's accidental displacement through this enlargement, and this I effect in any suitable manner—as, for instance, by inserting a screw Q in the under side of the tongue and through the enlargement s, as shown in Fig. 2, and against this screw the dog strikes, being thereby prevented from registering with the enlargement s.

Having thus described my invention, I claim—

1. A vehicle-tongue and a metallic strap secured to the lower side thereof near its forward end and provided with upwardly-facing ratchet-teeth, in combination with a dog having laterally-projecting feet engaging said ratchet-teeth, as and for the purpose set forth.

2. The tongue T, having the cut-away portions C and the strap L, secured over said cut-away portion, said strap having a central longitudinal slot S, and having ratchet-teeth R on its inner face on either side of said slot, in combination with the dog D, having laterally-projecting feet F adapted to engage said ratchet-teeth, substantially as described.

3. The tongue T, having the cut-away portion C and the strap L, secured over said cutaway portion, said strap having a central longitudinal slot S and a short lateral enlargement s at its rear end, and having ratchet-teeth R on its inner face on either side of said slot, in combination with the dog D, having laterally-projecting feet longer than the width of said slot, but corresponding with the width of said enlargement, as and for the purpose set forth.

4. The tongue T, having the cut-away portion C and the strap L, secured over said cutaway portion, said strap having a central longitudinal slot S and a short lateral enlargement s at its rear end, and having ratchet-teeth R on its inner face on either side of said slot, in combination with the dog D, having laterally-projecting feet longer than the width of said slot, but corresponding with the width of said enlargement, and the screw Q within said enlargement and seated in the tongue, as and for the purpose set forth.

5. The strap L, provided with a longitudinal slot S and having forwardly-facing ratchet-teeth R in its upper side, in combination with the dog D, having a triangular body and provided with laterally-extending feet F, having flat rear faces $f$ adapted to abut against the faces of said ratchets, substantially as described.

6. The strap L, provided with a longitudinal slot S and having forwardly-facing ratchet-teeth R in its upper side, in combination with the dog D, having a triangular body adapted to fit loosely in said slot and provided with laterally-extending feet F at its upper rear corner, having flat rear faces $f$ adapted to abut against the faces of said ratchets, the body of the dog being also provided with a lateral flange J along its lower edge, which flange is wider than the slot S and is formed with shoulders $b$, that abut against the lower face of said strap L upon either side of the slot, substantially as described.

7. The strap L, provided with ratchet-teeth in its upper face, in combination with the dog D, having a triangular body, said dog having laterally-extending feet F provided with flat rear faces $f$, which engage the ratchets when the dog is in one position, but will slide over them when in another, substantially as described.

In testimony that I claim the foregoing as my own I have hereto affixed my signature in presence of two witnesses.

DANIEL W. RAIDT.

Witnesses:
JOHN A. MOTT,
LOUIS W. MOTT.